Jan. 18, 1949.  C. K. STILLWAGON  2,459,250
DOUBLE SEAL FLANGE UNION
Filed March 11, 1944

Inventor
Crawford K. Stillwagon
By E. V. Hardway,
Attorney

UNITED STATES PATENT OFFICE 2,459,250

DOUBLE SEAL FLANGE UNION

Crawford K. Stillwagon, Houston, Tex., assignor to Well Equipment Mfg. Corp., Houston, Tex., a corporation of Texas Application March 11, 1944, Serial No. 526,052

2 Claims. (Cl. 285—137)

This invention relates to a double seal flange union.

An object of the invention is to provide a union of the character described composed of two flanges with a special type of gasket between them and having also contacting parts whereby a double seal will be formed between the flanges, the flange and seal assembly forming means for connecting adjacent sections of pipe with a leak proof joint or union.

With the above and other objects in view, the invention has particular relation to certain novel features of construction, arrangement of parts and use, an example of which is given in this specification and illustrated in the accompanying drawings, wherein.

Figure 1:
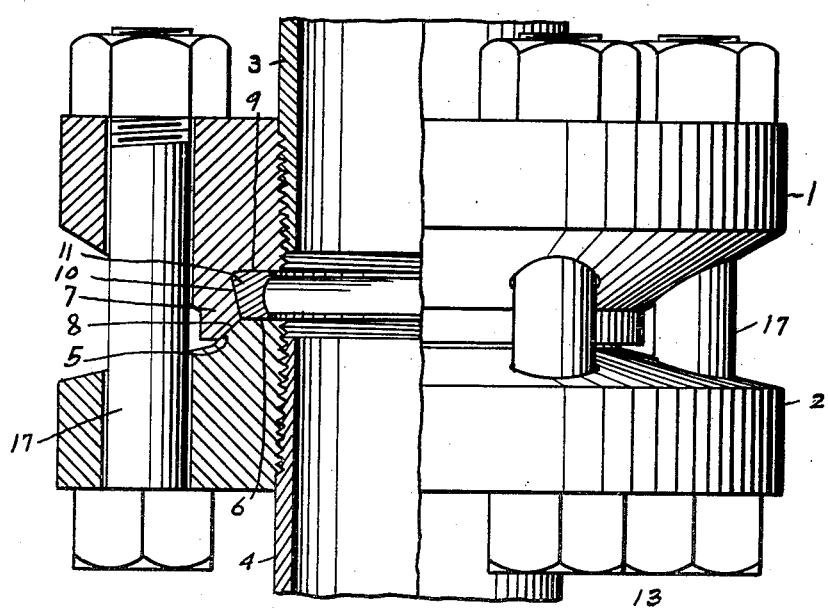
Figure 1 shows a side view of the union, partly in section.
Figure 3:
Figure 3 shows a cross sectional view of the gasket employed.
Figure 2:
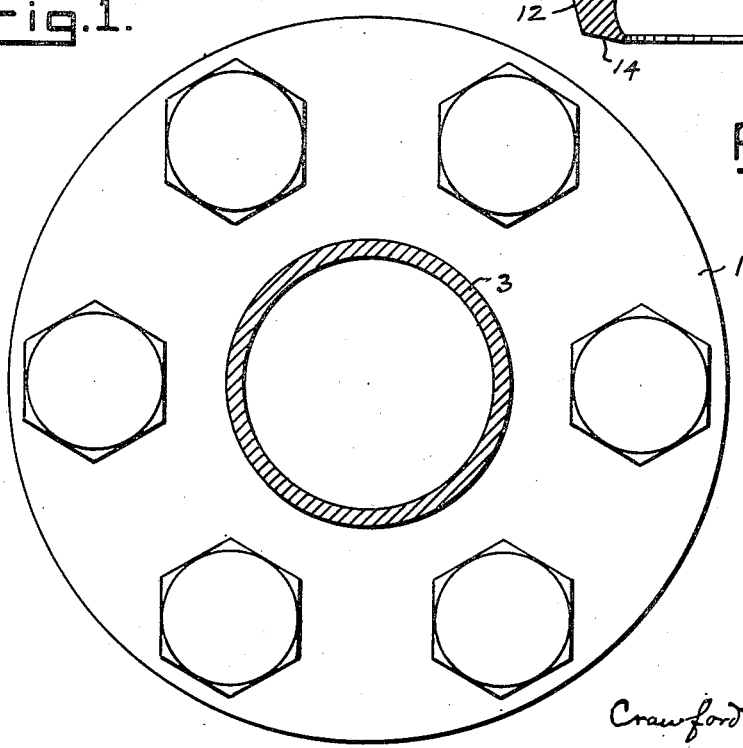
Figure 2 shows an end view showing the pipe in section.

Referring now more particularly to the drawings wherein like numerals of reference designate the same parts in each of the figures, the numerals 1 and 2 designate, respectively, the flanges of the union which are internally threaded for the connection of adjacent sections 3 and 4 of pipe thereto.

The inner side of the flange 2 has an annular seat 5 which converges, on a uniform taper, inwardly. The inner side of the flange 2 also has an end face 6 within the tapering face 5.

The inner side of the flange 1 is formed with an annular rib 7 provided with a flared end face 8 forming an annular seat which fits closely against the seat 5 when the parts are assembled. These faces 5 and 8 are ground smooth so as to form a leak proof joint between them.

Within the rib 7 the inner side of the flange 1 is formed with a countersunk portion presenting the inside face, or wall, 9 which is approximately parallel with the end face 6 and is spaced therefrom, and also presenting the outer side wall 10 which tapers or converges toward the inner margin of the flared face 8; accordingly when the flanges are assembled together, an annular inside groove is thus formed to receive the gasket 11.

This gasket is formed of yieldable material such as neoprene or other similar material. Its outer face 12 is tapered relative to its axis so as to fit closely against the wall 10 of said groove. The end faces 13 and 14 of the gasket converges outwardly, the former at approximately a two degree angle and the latter at approximately a ten degree angle with respect to the axis of the gasket. These angles, of course, may be varied.

Preferably the inner side of the gasket is concaved from one end face to the other thus providing the annular end lips 15, 16 which extend inwardly. The inner side of the gasket is somewhat wider than the width of the groove in which it is designed to fit so that when the flanges 1 and 2 are fitted and bolted together, a compressive force will be exerted against the gasket so as to cause the gasket to conform its shape to the shape of said groove, as shown in Figure 1, and the gasket will be held at said groove under compression with the lips fitting tightly against the opposing sides of the groove. Furthermore, in this particular type of union, as the contacting areas of the faces 5 and 8 wear, it will permit a further tightening up of the clamp bolts, hereinafter referred to, thus exerting a further compressive force on the gasket to increase the sealing effect thereof, to stop a leak that might develop.

The flanges 1 and 2 are clamped together, in assembled relation, by clamp bolts 17 which are fitted through aligned holes therein and are provided with heads on one end and clamp nuts screwed on the other end.

The fluid flowing under pressure through the line and tend to press the gasket more securely in place and will tend to spread the lips into close sealing relationship with the opposing sides of the groove. If the gasket were made to fit the groove and were not held therein under compression, the fluid flowing through the line would unseat the gasket and displace it from the groove.

What I claim is:

1. A union comprising aligned flanges, one of said flanges having an annular, inwardly converging, seat and having an annular end face within said seat, the inner side of the other flange being formed with an annular rib provided with a flared, annular seat, said seats fitting closely together when the flanges are assembled, the inner side of the rib being countersunk, annularly, and thus presenting an inside wall which is parallel with said end face and spaced therefrom and also presenting an outer side wall which converges toward the inner margin of the flared seat thus providing an inside annular groove when the flanges are assembled, a gasket fitted in said groove and clamp bolts securing said flanges in assembled relation with said seats fitting together and with the gasket under compression between said inside wall and the end face.

2. A union comprising two flanges, the inner side of one flange being formed with an annular, inwardly converging tapered seat and having an annular end face within said seat and in a plane at right angles to the axis of the union, the inner side of the other flange having an annular rib provided with a flared annular seat, said seats being ground smooth and being arranged to fit closely together to form a fluid tight joint when the flanges are assembled, said union being provided with an annular countersunk portion around the inside of said rib presenting an inside wall parallel with and spaced from said end face and presenting an outer side wall which converges inwardly, a gasket formed of yieldable material whose outer face is tapered to fit against said tapering outer wall said gasket having end faces which converge outwardly, said gasket being concaved from one end face to the other providing annular end lips which extend inwardly, the inner side of the gasket being wider than the width of said groove and said gasket being fitted into said groove and conforming to the shape thereof and being held therein under compression by said end face and wall when the flanges are assembled and means for clamping the flanges in assembled relation.

CRAWFORD K. STILLWAGON.

REFERENCES CITED

The following references are of record in the file of this patent:

UNITED STATES PATENTS

| Number | Name | Date |
|---|---|---|
| 448,765 | Kaiser | Mar. 24, 1891 |
| 674,935 | Meadowcroft | May 28, 1901 |
| 790,767 | Walsh | May 27, 1905 |
| 924,039 | Clark | June 8, 1909 |
| 930,692 | Robinson | Aug. 10, 1909 |
| 1,339,636 | Tulloch | May 11, 1920 |
| 2,238,462 | Crepeau | Apr. 15, 1941 |